United States Patent [19]

Silberschlag

[11] 3,890,884
[45] June 24, 1975

[54] HYDRAULIC ACTUATOR

[75] Inventor: Russell E. Silberschlag, Glen Ellyn, Ill.

[73] Assignee: Borg-Warner Corporation, Chicago, Ill.

[22] Filed: Nov. 23, 1973

[21] Appl. No.: 418,534

[52] U.S. Cl. ............ 92/84; 92/129; 92/140; 92/187; 188/72.4; 188/217; 403/144
[51] Int. Cl. ............ F16j 1/10; F16d 65/32
[58] Field of Search ............ 92/84, 129, 140, 187; 403/76, 144; 188/72.4, 72.5, 217, 370

[56] References Cited
UNITED STATES PATENTS

| | | | |
|---|---|---|---|
| 3,035,666 | 5/1962 | Beeskow | 188/217 |
| 3,158,072 | 11/1964 | Detrez | 92/187 X |
| 3,177,978 | 4/1965 | Weltyk | 188/217 X |
| 3,498,418 | 3/1970 | Dewar | 188/72.4 X |
| 3,653,472 | 4/1972 | Dowell | 188/217 |

FOREIGN PATENTS OR APPLICATIONS

| | | | |
|---|---|---|---|
| 1,101,244 | 4/1955 | France | 188/370 |
| 914,538 | 1/1963 | United Kingdom | 92/84 |

Primary Examiner—Irwin C. Cohen
Attorney, Agent, or Firm—Herman E. Smith

[57] ABSTRACT

An hydraulic actuator has a cup-like piston with a thrust assembly nested therein which is rockably mounted in the piston to avoid eccentric loading of the piston. A resilient collar resets or restores the thrust assembly to a centered position after each actuation. The apparatus is particularly advantageous where a compact actuator is required having a piston in which the head diameter is large relative to its length.

3 Claims, 3 Drawing Figures

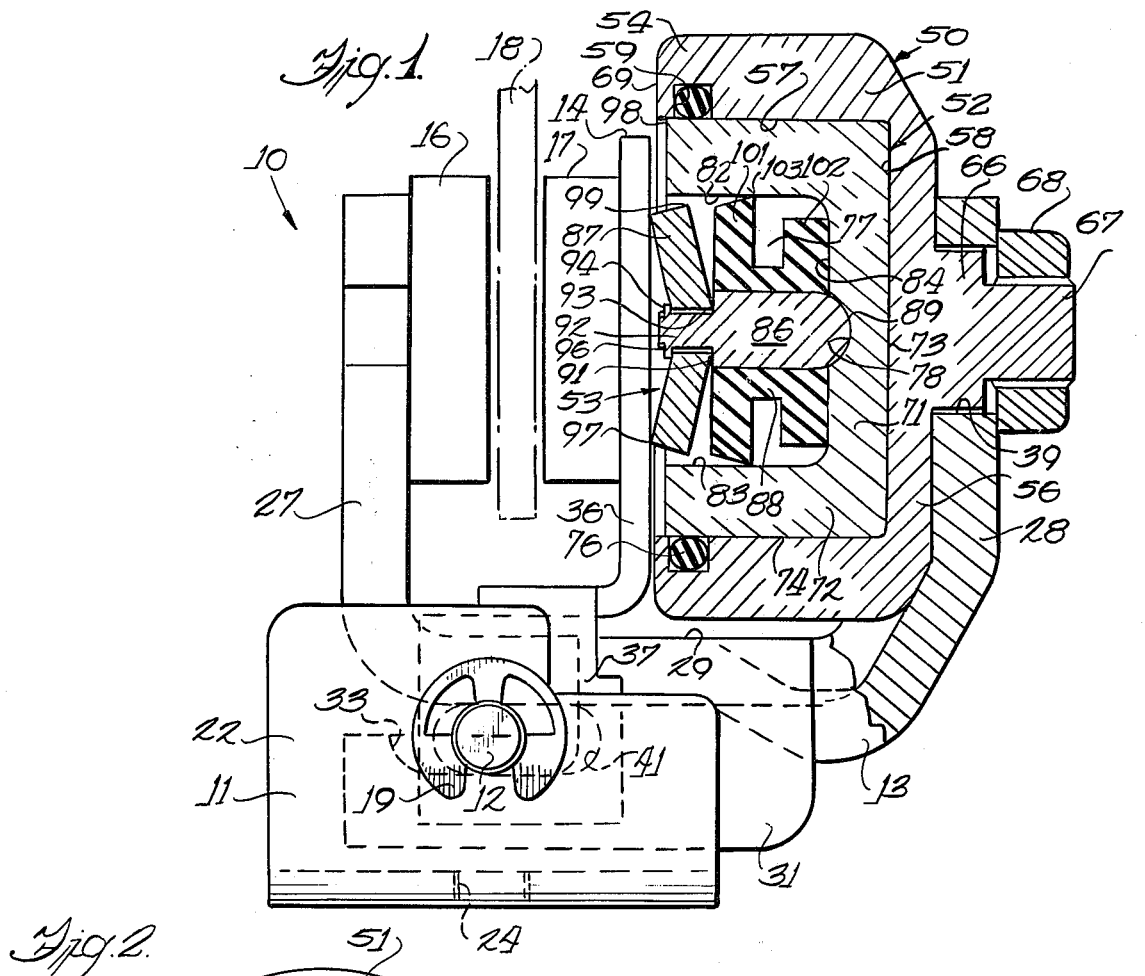
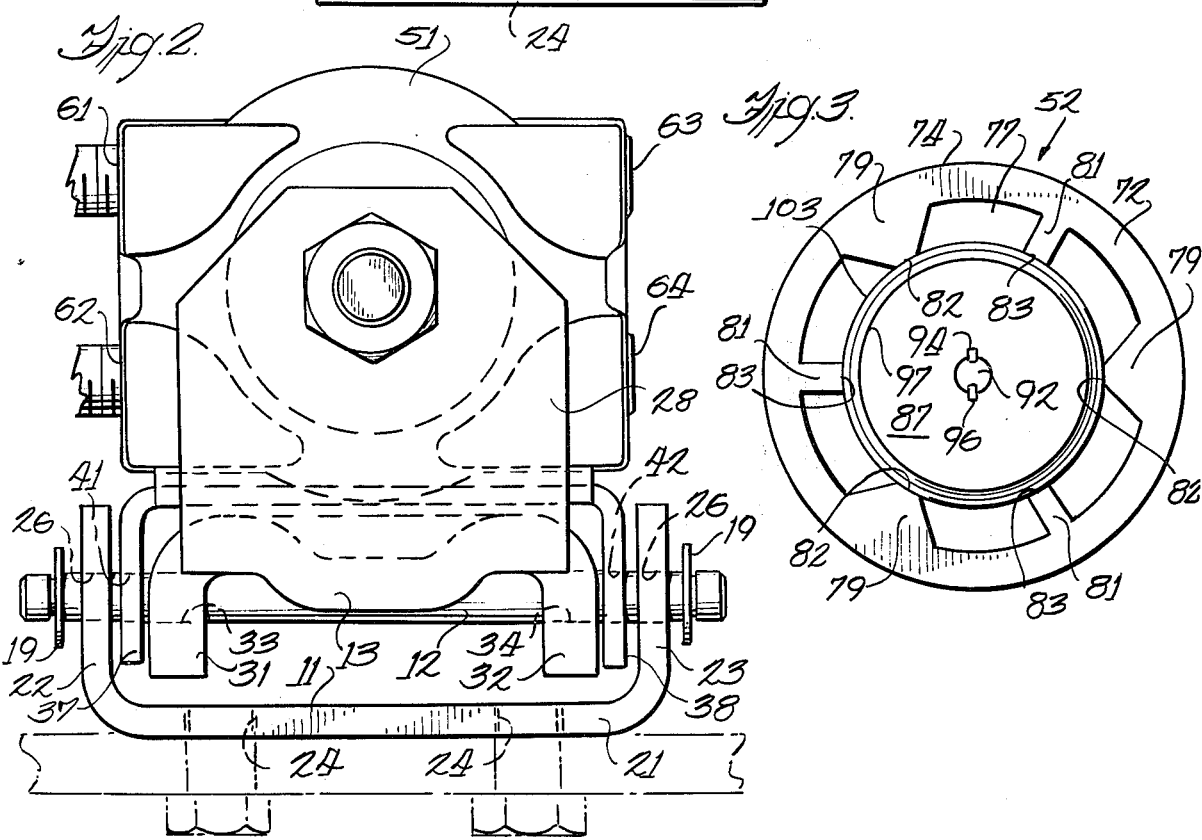

HYDRAULIC ACTUATOR

BACKGROUND OF THE INVENTION

In the construction of hydraulic actuators of the expansible chamber type having a piston arranged to slide within a cylindrical cavity, it is ordinarily considered desirable to provide for guidance of the piston as it slides in the cavity to prevent cocking and consequent sticking or jamming of the piston in the cavity. In some cases, it is desirable to provide a piston which has a relatively long skirt, or sidewall, relative to the diameter of the head, while in other cases a relatively short sidewall may be employed in combination with a rod rigidly connected to the piston and supported concentrically with respect to the cavity.

The above-mentioned design approaches become difficult to employ where it is desired to provide a compact yet powerful hydraulic actuator or load cell, that is to say an actuator having a large area for providing greater force while at the same time having a short axial dimension.

While compact actuators can be useful for many purposes, one particularly important application is for actuating disc type braking apparatus. Disc type braking apparatus is ordinarily not self-energizing thus requiring a greater actuating force than a drum and shoe type brake of similar capacity. At the same time, disc type braking apparatus often requires a relatively short, compact axial dimension as a result of space limitations in the environment adjacent the rotor with which it is employed.

SUMMARY OF THE INVENTION

The present invention relates generally to hydraulic actuators and more particularly to compact actuators so constructed and arranged as to minimize sticking or jamming of a slidable piston in an expansible chamber. The invention includes the combination of a thrust assembly disposed within a cup shaped piston and having a socketed connection therewith isolating the piston sidewall from lateral forces on the thrust assembly. A further advantage of the invention resides in providing a resilient yieldable centering member for respositioning the thrust assembly following lateral displacement of the outer end thereof.

BRIEF DESCRIPTION OF THE DRAWING

FIG. 1 is a side view of a disc braking apparatus to enlarged scale with a portion in section showing a hydraulic actuator according to the present invention;

FIG. 2 is an end view of the braking apparatus and actuator shown in FIG. 1 to smaller scale; and FIG. 3 is an end view of the piston and thrust assembly of FIG. 1.

DESCRIPTION OF THE PREFERRED EMBODIMENT

Referring now to the drawing and more particularly FIG. 1 thereof, the reference 10 indicates a caliper type disc brake apparatus having a hydraulic actuator or load cell 50.

The caliper brake 10 includes a bracket 11, a mounting pin 12, a frame member 13, a slideable shoe 14, engageable with actuator 50, friction pads 16, 17 arranged on opposite sides of a rotor 18, and spring clips 19, 19 securing the frame, shoe and bracket in assembly on the pin.

Bracket 11 includes a base portion 21 and a pair of ears 22, 23 extending therefrom. Apertures 26, 26 are formed in ears 22, 23 for receiving pin 12. Bracket 11 can be secured to a nonrotatable machine member by means of cap screws engaging threaded apertures 24, 24, however, other means for securing the brake apparatus to a machine member can be employed, if desired.

Frame member 13 includes a pair of spaced wall portions 27, 28 extending upwardly from a base portion 29 and a pair of channel walls 31, 32 extending downwardly therefrom. The channel walls include slots 33, 34 engaging pin 12 permitting the frame to turn and slide with respect to the pin. Friction pad 16 is secured to wall portion 27 while actuator 50 is secured to wall portion 28.

Shoe 14 includes an upstanding wall portion 36 to which friction pad 17 is secured and a pair of down turned flanges 37, 38. Flanges 37, 38 includes slots 41, 42 engaging pin 12 permitting movement of shoe 14 with respect to frame 13 and pin 12.

Actuator 50 includes a housing 51, a cup shaped piston 52 and a thrust assembly 53. Housing 51 includes a substantially annular wall portion 54 and a bottom wall portion 56 having internal surfaces 57, 58 defining a chamber therein. Annular wall portion 54 terminates in a face 69 opposite of bottom wall 56. A seal ring groove 59 is formed in wall 54 extending outwardly from internal cylindrical surface 57. Housing 51 includes one or more ports as indicated at 61, 62, 63, 64 extending through a wall thereof communicating with internal chamber 57, 58. It is desirable to provide two such ports, one for the admission of pressure fluid and another for bleeding entrapped air from the internal chamber. If additional ports are provided as indicated in FIG. 2, the unused ports such as 63, 64 can be plugged. Bottom wall portion 56 includes an external projection 66 extending into an aperture 39 in frame wall 28. A threaded stud 67 extends from projection 66 and is engaged by a threaded nut 68 for securing housing 51 to frame member 13.

Cup shaped piston 52 includes a headwall portion 71 and an annular skirt wall portion 72 having a head surface 73 and a cylindrical side wall surface 74 cooperating with internal surfaces 57, 58 to form an expansible chamber. A seal ring 76 in seal ring groove 59 embraces sidewall surface 74 to prevent leakage of fluid between surfaces 57, 74. Head wall portion 71 and skirt wall portion 72 define a central cavity 77 in cup shaped piston 52. A seat 78 is formed in central cavity 77 in head wall portion 71. Ribs 79, 81 project radially into central cavity 77 from skirt wall portion 72 and merge into head wall portion 71 providing rigidity for piston 52. Ribs 79 have internal surfaces 82, and ribs 81 have internal surfaces 83 arranged substantially concentrically with respect to cavity 77. Headwall 71 includes an annular surface 84 extending around seat 78 in cavity 77.

Thrust assembly 53 includes a strut 86, an annular foot 87 and a resilient collar 88. An inner end of strut 86 is provided with a head 89 while an outer end thereof is provided with a shoulder 91 and projection 92. Annular foot 87 is of frusto conical configuration having a central portion 93 engaging shoulder 91 and projection 92 of strut 86. The cone height of foot 87 is greater than the length of projection 92 which is staked or deformed at 94, 96 to secure the strut loosely to the foot. The cone height of the foot is further selected such that its peripheral edge 97 extends outwardly of cavity 77 beyond the outer face 98 of piston 52 when assembled with strut 86 bearing against seat 78. The diameter of outer edge 99 of foot 87 is selected so as to permit a limited degree of lateral movement of the foot resulting in rocking of the thrust assembly 53 in cavity 77.

Resilient collar 88 is in the form of a yieldable elastomeric sleeve embracing strut 86. Collar 88 includes a pair of spaced annular portions 101, 102. Annular portion 102 has a surface thereof abutting surface 84 of cavity 77 extending around seat 78. The other annular portion 102 is located adjacent foot 87 and includes a peripheral edge 103 extending radially beyond outer edge 99 of foot 87 into engagement with surfaces 82, 83 of ribs 79, 81.

In order to more fully appreciate the advantages of the invention, an example of the operation of the hydraulic actuator in combination with disc braking apparatus is described. When it is desired to actuate the apparatus, fluid under pressure is supplied to a port such as 61 from which it enters the expansible chamber defined by surfaces 57, 58, 73 thus urging piston 52 outwardly with respect to surface 58 and face 69. The motive force exerted on head surface 73 by the pressure fluid is transmitted to strut 86 through seat 78 and head 89. The strut transmits the force through shoulder 91 to the inner portion 93 of foot 87 which then transmits the force through peripheral edge 97 to shoe 14.

The force transmitted to the shoe 14 and the corresponding reaction force on walls 56 and 28 cause frame 13 and shoe 14 to slide in opposite directions with respect to pin 12 such that shoes 16, 17 clamp opposite surfaces of rotor 18. If the rotor is turning when clamping takes place, some lateral movement of shoe 14 with respect to frame 13 can be expected as a result of the clearances required to permit sliding of the members. When shoe 14 moves laterally with respect to frame 13, foot 87 is displaced laterally in cavity 77 causing strut 86 to rock in seat 78. Rocking of strut 86 in cavity 77 results in deformation of annular portion 102 bearing against surface 84 and deformation of peripheral edge 103 bearing against surfaces 82, 83. The sleeve 88 being resilient and yieldable tends to restore the strut 86 and foot 87 to a concentric position in cavity 77 when the hydraulic actuating pressure is relieved. Thus the collar resets the thrust assembly to a centered position after each actuation such that upon reactuation, the forces will be transmitted along the axial center line of the piston.

Thrust assembly 53 is particularly advantageous for alleviating cocking or jamming of a piston in the chamber when employed in combination with a piston having a short sidewall 74 relative to the diameter of the head surface 73, since it isolates the outer end 98 from eccentric reaction loads.

What is claimed is:

1. An hydraulic actuator comprising a housing member including a substantially cylindrical chamber opening outwardly through a wall thereof and a generally cup shaped piston slidably received within said chamber and adapted to move outwardly in response to fluid pressure in said chamber, said piston including head and skirt wall portions defining a central cavity opening outwardly of said actuator, said head portion including a seat in said cavity remote from the open end thereof, and a thrust assembly extending into said central cavity having an annular foot disposed outwardly of said piston, a strut having a head portion engageable with said seat extending through said central cavity between said annular foot and said piston head wall, and a resilient collar embracing said strut adjacent said annular foot having intersecting planar surfaces thereon defining a peripheral sharp edge frictionally engaging said skirt portion of said piston, said resilient collar being an elastomeric sleeve including a pair of spaced annular portions, one of said annular portions defining said sharp peripheral edge engaging said piston skirt adjacent said annular foot, and the other of said annular portions having a face abutting said piston head wall portion outwardly of said seat, said collar peripheral edge yieldably urging said strut toward a centered position with respect to said piston skirt permitting displacement of said strut from said centered position under load while substantially isolating said piston skirt from lateral forces imposed on said thrust assembly under load.

2. An actuator according to claim 1, said strut including a projection defining a shoulder remote from said head portion thereof, said annular foot being of frustoconical configuration having a central portion thereof bearing against said shoulder.

3. An actuator according to claim 1, said piston skirt wall portion including rib portions projecting into said cavity and merging into said head portion, said collar including a yieldable annular portion defining said sharp peripheral edge engaging said rib portions.

* * * * *